(12) United States Patent
Trainer et al.

(10) Patent No.: US 11,121,639 B2
(45) Date of Patent: Sep. 14, 2021

(54) VOLTAGE CONVERTER

(71) Applicant: ROLLS-ROYCE plc, London (GB)

(72) Inventors: David R Trainer, Derby (GB);
 Zhigang Sun, Derby (GB); Ellis F H Chong, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/747,760

(22) Filed: Jan. 21, 2020

(65) Prior Publication Data
 US 2020/0244181 A1  Jul. 30, 2020

(30) Foreign Application Priority Data
 Jan. 25, 2019 (GB) ...................................... 1901027

(51) Int. Cl.
 *H02M 7/219* (2006.01)
 *F02C 6/00* (2006.01)
 (Continued)

(52) U.S. Cl.
 CPC ............... *H02M 7/219* (2013.01); *F02C 6/00* (2013.01); *H02P 9/305* (2013.01); *H02M 1/14* (2013.01)

(58) Field of Classification Search
 CPC . H02M 7/219; H02M 1/14; F02C 6/00; H02P 9/305
 See application file for complete search history.

(56) References Cited

U.S. PATENT DOCUMENTS

| 4,498,127 A | 2/1985 | Fiorina | |
| 2008/0205093 A1* | 8/2008 | Davies | H02M 7/49 363/35 |

(Continued)

FOREIGN PATENT DOCUMENTS

| GB | 2383695 A | 7/2003 |
| WO | 2014/082661 A1 | 6/2014 |

OTHER PUBLICATIONS

Combined Search and Examination Report of the Intellectual Property Office of the United Kingdom for GB1901027.1 dated Jun. 21, 2019.

(Continued)

*Primary Examiner* — Sean Gugger
(74) *Attorney, Agent, or Firm* — Oliff PLC

(57) ABSTRACT

Disclosed herein is a converter for converting an AC voltage to a DC voltage, the converter comprising: a first H-bridge circuit comprising a first AC terminal for receiving an AC voltage, a second AC terminal, a first DC terminal and a second DC terminal; a second H-bridge circuit comprising a first AC terminal for receiving an AC voltage, a second AC terminal, a first DC terminal and a second DC terminal; an isolation block arranged between the second AC terminal of the first H-bridge circuit and the second AC terminal of the second H-bridge circuit; and a DC voltage output of the converter with a first terminal and a second terminal; wherein: the first terminal of the DC voltage output is connected to the first DC terminal of the first H-bridge circuit and the first DC terminal of the second H-bridge circuit; and the second terminal of the DC voltage output is connected to the second DC terminal of the first H-bridge circuit and the second DC terminal of the second H-bridge circuit.

16 Claims, 9 Drawing Sheets

(51) Int. Cl.
*H02P 9/30* (2006.01)
*H02M 1/14* (2006.01)

(56) References Cited

U.S. PATENT DOCUMENTS

| | | | |
|---|---|---|---|
| 2009/0080225 A1* | 3/2009 | Dijkhuizen | H02M 7/5395 |
| | | | 363/65 |
| 2014/0140104 A1 | 5/2014 | Norrga et al. | |
| 2014/0268959 A1* | 9/2014 | Frohman | H02M 7/797 |
| | | | 363/98 |
| 2015/0049530 A1* | 2/2015 | Trainer | H02M 7/797 |
| | | | 363/123 |
| 2015/0315980 A1* | 11/2015 | Edwards | F02C 7/22 |
| | | | 60/772 |

OTHER PUBLICATIONS

May 27, 2020 extended Search Report issued in European Patent Application No. 20151630.9.

\* cited by examiner

No Phase Shift

With Phase Shift
$V_{[SUM]}$ REDUCED

VOLTAGE CONVERTER

CROSS-REFERENCE TO RELATED APPLICATIONS

This specification is based upon and claims the benefit of priority from United Kingdom patent application number GB 1901027.1 filed on Jan. 25, 2019, the entire contents of which are incorporated herein by reference.

BACKGROUND

Field of the Disclosure

The present disclosure relates to the conversion of an AC voltage to a DC voltage. Embodiments may provide a single stage converter for generating a DC power supply from the AC output of an electrical generator on an aircraft.

SUMMARY OF THE DISCLOSURE

According to a first aspect there is provided a converter for converting an AC voltage to a DC voltage, the converter comprising: a first H-bridge circuit comprising a first AC terminal for receiving an AC voltage, a second AC terminal, a first DC terminal and a second DC terminal; a second H-bridge circuit comprising a first AC terminal for receiving an AC voltage, a second AC terminal, a first DC terminal and a second DC terminal; an isolation block arranged between the second AC terminal of the first H-bridge circuit and the second AC terminal of the second H-bridge circuit; and a DC voltage output of the converter with a first terminal and a second terminal; wherein: the first terminal of the DC voltage output is connected to the first DC terminal of the first H-bridge circuit and the first DC terminal of the second H-bridge circuit; and the second terminal of the DC voltage output is connected to the second DC terminal of the first H-bridge circuit and the second DC terminal of the second H-bridge circuit.

According to a second aspect there is provided a converter for converting an AC voltage to a DC voltage, the converter comprising: a first H-bridge circuit comprising a first AC terminal for receiving an AC voltage, a second AC terminal, a first DC terminal and a second DC terminal; a second H-bridge circuit comprising a first AC terminal for receiving an AC voltage, a second AC terminal, a first DC terminal and a second DC terminal; an isolation block arranged between the second AC terminal of the first H-bridge circuit and the second AC terminal of the second H-bridge circuit; and a DC voltage output of the converter with a first terminal and a second terminal; wherein: the second DC terminal of the first H-bridge circuit is connected to the first DC terminal of the second H-bridge circuit; the first terminal of the DC voltage output is connected to the first DC terminal of the first H-bridge circuit; and the second terminal of the DC voltage output is connected to the second DC terminal of the second H-bridge circuit.

In the first and/or second aspect the first H-bridge circuit may comprise: a first switch of the first H-bridge circuit, wherein the first switch is arranged between the first AC terminal of the first H-bridge circuit and the first DC terminal of the first H-bridge circuit; a second switch of the first H-bridge circuit, wherein the second switch is arranged between the first AC terminal of the first H-bridge circuit and the second DC terminal of the first H-bridge circuit; a third switch of the first H-bridge circuit, wherein the third switch is arranged between the second AC terminal of the first H-bridge circuit and the first DC terminal of the first H-bridge circuit; and a fourth switch of the first H-bridge circuit, wherein the fourth switch is arranged between the second AC terminal of the first H-bridge circuit and the second DC terminal of the first H-bridge circuit; and wherein the second H-bridge circuit comprises: a first switch of the second H-bridge circuit, wherein the first switch is arranged between the second AC terminal of the second H-bridge circuit and the first DC terminal of the second H-bridge circuit; a second switch of the second H-bridge circuit, wherein the second switch is arranged between the second AC terminal of the second H-bridge circuit and the second DC terminal of the second H-bridge circuit; a third switch of the second H-bridge circuit, wherein the third switch is arranged between the first AC terminal of the second H-bridge circuit and the first DC terminal of the second H-bridge circuit; and a fourth switch of the second H-bridge circuit, wherein the fourth switch is arranged between the first AC terminal of the second H-bridge circuit and the second DC terminal of the second H-bridge circuit.

In the first and/or second aspect one or more of the first, second, third and fourth switches of the first H-bridge circuit may comprise a transistor and/or a diode; and/or one or more of the first, second, third and fourth switches of the second H-bridge circuit may comprise a transistor and/or a diode.

In the first and/or second aspect the first H-bridge circuit may comprise a capacitor arranged between the first DC terminal and the second DC terminal of the first H-bridge circuit; and/or the second H-bridge circuit may comprise a capacitor arranged between the first DC terminal and the second DC terminal of the second H-bridge circuit.

In the first and/or second aspect the isolation block may be a transformer.

In the first and/or second aspect: a first terminal of a first side of the transformer may be connected to the second AC terminal of the first H-bridge circuit; a second terminal of a first side of the transformer may be connected to an AC voltage input to the converter; a first terminal of a second side of the transformer may be connected to the second AC terminal of the second H-bridge circuit; and a second terminal of a second side of the transformer may be connected to the first AC terminal of the second H-bridge circuit.

In the first and/or second aspect, the converter may comprise one or more phase shifters; wherein, in use, there is a first AC voltage between the first AC terminal and second AC terminal of the first H-bridge circuit; there is a second AC voltage between the first AC terminal and second AC terminal of the second H-bridge circuit; and the one or more phase shifters are arranged to control the phase difference between the first AC voltage and the second AC voltage.

In the first and/or second aspect the converter may further comprise a switching controller; wherein, in use, the switching times of one or more of the switches in the first H-bridge circuit and/or one or more of the switches in the second H-bridge circuit are dependent on the switching controller.

According to a third aspect there is provided a converter system for providing a DC voltage in dependence on an AC voltage, the converter system comprising: a DC output of the converter system with a first terminal and a second terminal; and either: a plurality of converters according to the first aspect or a plurality of converters according to the second aspect; wherein: each of the plurality converters is arranged to receive an AC voltage; the first terminal of the DC output of the converter system is connected to the first terminal of the DC voltage output of each converter; and the second terminal of the DC output of the converter system is connected to the second terminal of the DC voltage output of each converter.

In the third aspect the converter system may further comprise a capacitor arranged between the first terminal of the DC output of the converter system and the second terminal of the DC output of the converter system.

According to a fourth aspect there is provided a DC power supply comprising an AC generator and the converter system according to the third aspect, wherein: the number of converters that the converter system comprises is the same as the number of output phases of the AC generator; and each converter of the converter system is arranged to receive an AC voltage from a different output phase of the AC generator.

In the fourth aspect, the number of converters comprised by the converter system may be three.

According to a fifth aspect there is provided a gas turbine engine system comprising: a gas turbine engine; and the DC power supply according to the fourth aspect; wherein the gas turbine engine is arranged to drive the AC generator of the DC power supply.

In the fifth aspect the gas turbine may be for an aircraft and comprise: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

In the fifth aspect: the turbine may be a first turbine, the compressor may be a first compressor, and the core shaft may be a first core shaft; the engine core may further comprise a second turbine, a second compressor, and a second core shaft connecting the second turbine to the second compressor; and the second turbine, second compressor, and second core shaft may be arranged to rotate at a higher rotational speed than the first core shaft.

According to a sixth aspect there is provided a method for providing a DC power supply, the method comprising: receiving an AC voltage by a converter according to the first and/or second aspect or receiving AC voltages by converter system according to the third aspect; generating a DC voltage in dependence on each received AC voltage; and outputting the generated DC voltage.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 20 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 230 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
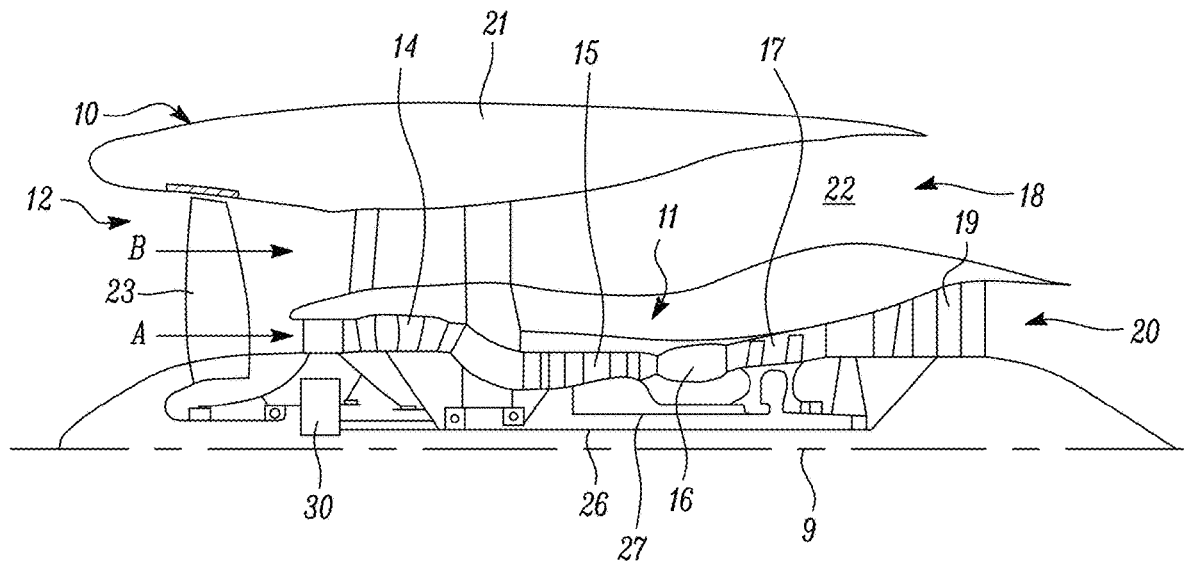
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
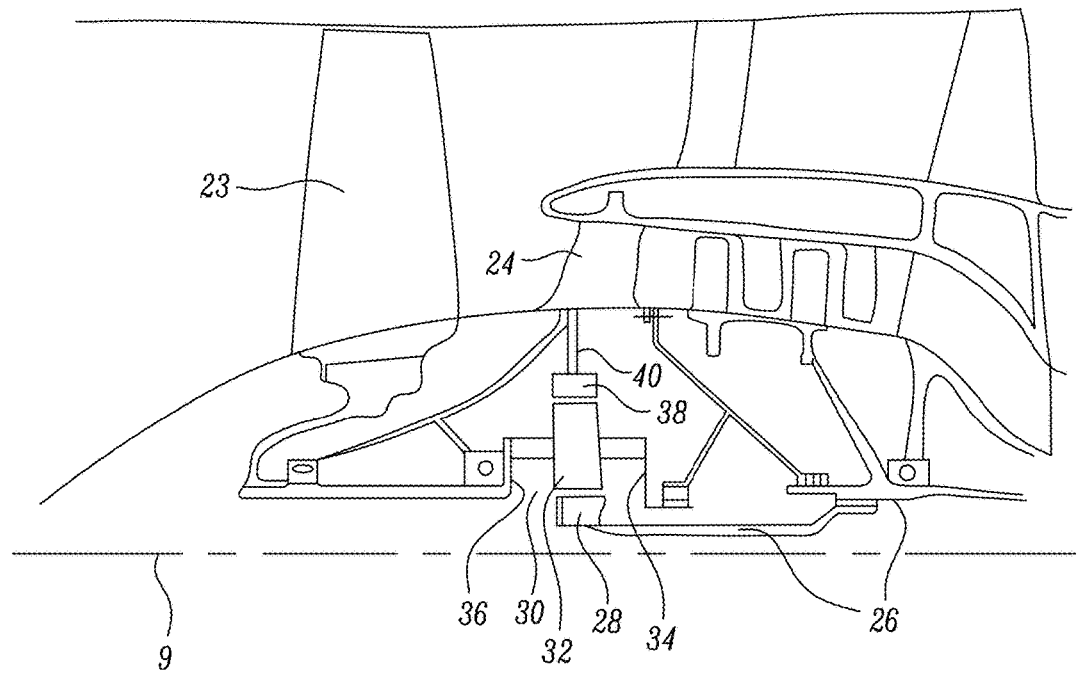
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
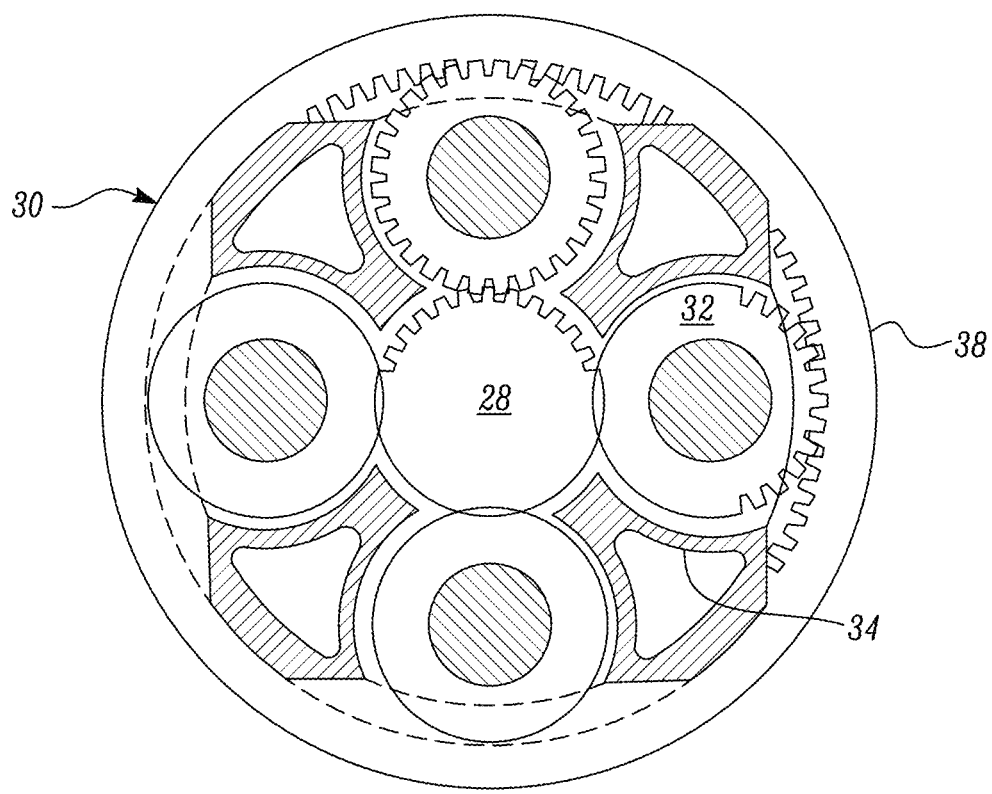
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Aircraft require an electrical power supply for powering the on board electrical systems. The electrical power supply is typically generated as an AC voltage power supply and then converted to a DC voltage power supply by converting the AC voltage to a DC voltage. The power source that generates the AC voltage power supply may be a generator, such as a synchronous electrical machine that may be a permanent magnet (PM) machine with wound fields or a wound field synchronous machine that does not have permanent magnets and instead has electromagnet(s) on the rotor. The output electrical power of the generator may be 120 kW. The frequency of the AC voltage output from the generator may be in the range 100 Hz-1000 Hz or higher. For large civil aircraft, such as the A380, B787 and A350, the frequency of the AC voltage may be 400-800 Hz. The DC electrical power supply may be a 270 $V_{DC}$ power supply or a 540 $V_{DC}$ power supply.

The use of an AC to DC converter allows the magnitude of the DC voltage to be controlled when there are variations in the speed of the generator and/or the load on the DC power supply changes. In order for the converter to be suitable for use on an aircraft, the converter should be compact and light-weight.

For low power applications, the output DC voltage from the converter and the peak alternating voltage of the generator may have similar magnitudes and a 6-switch converter can be used to for the AC to DC conversion stage. However, the use of such a converter is not appropriate for high power applications, such as when a 120 kW power source is required, because there is a compromise between providing good performance of the converter and providing good performance of the generator.

Figure 4:
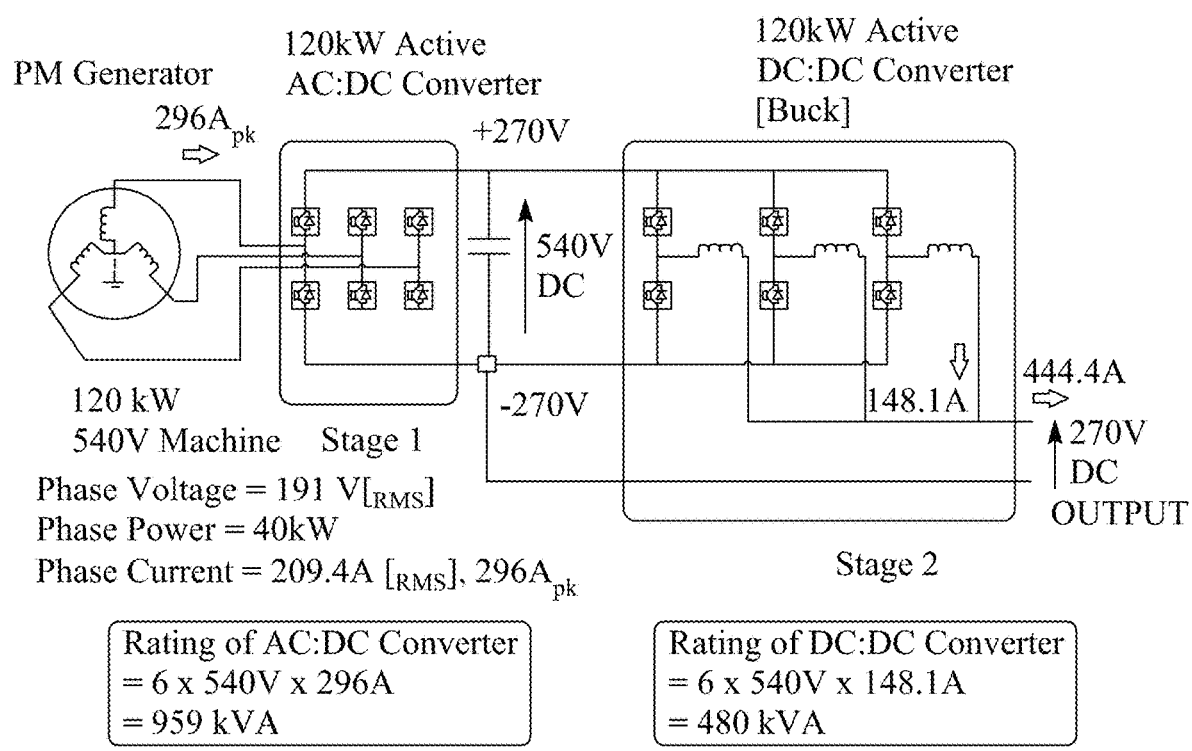
FIG. 4 shows a known two stage voltage converter.

FIG. 4 shows a known design of converter that is being used to generate a 270 $V_{DC}$ power supply from a 120 kW PM electrical generator. In order to provide good performance of the generator, the generator is designed to interface with a converter fed from a 540 $V_{DC}$ bus, i.e. ±270 $V_{DC}$. The output from the converter is then input to a DC to DC conversion stage that steps the 540 $V_{DC}$ down to 270 $V_{DC}$.

The alternative single stage approach of using the AC to DC converter shown in FIG. 4 to directly provide the 270 $V_{DC}$ output, i.e. ±135 $V_{DC}$, and not having a separate stage for stepping down the DC voltage, requires a very high current design of generator and converter. The peak current would be 592 A and this increases the power losses and requires winding conductors and cables with large diameters. The generator required for such a single stage converter may need to be 20% larger in both weight and volume from the generator required when the two stage conversion shown in FIG. 4 is used.

A problem with the two stage conversion shown in FIG. 4 is that the efficiency of each stage may be 97% and the overall efficiency may therefore be only 94%. The 6% of power loss is expended as heat and this increases the demand on the thermal management systems, such as heatsinks and/or fluid cooling, and therefore increases the size and weight of the required equipment.

Figure 5:
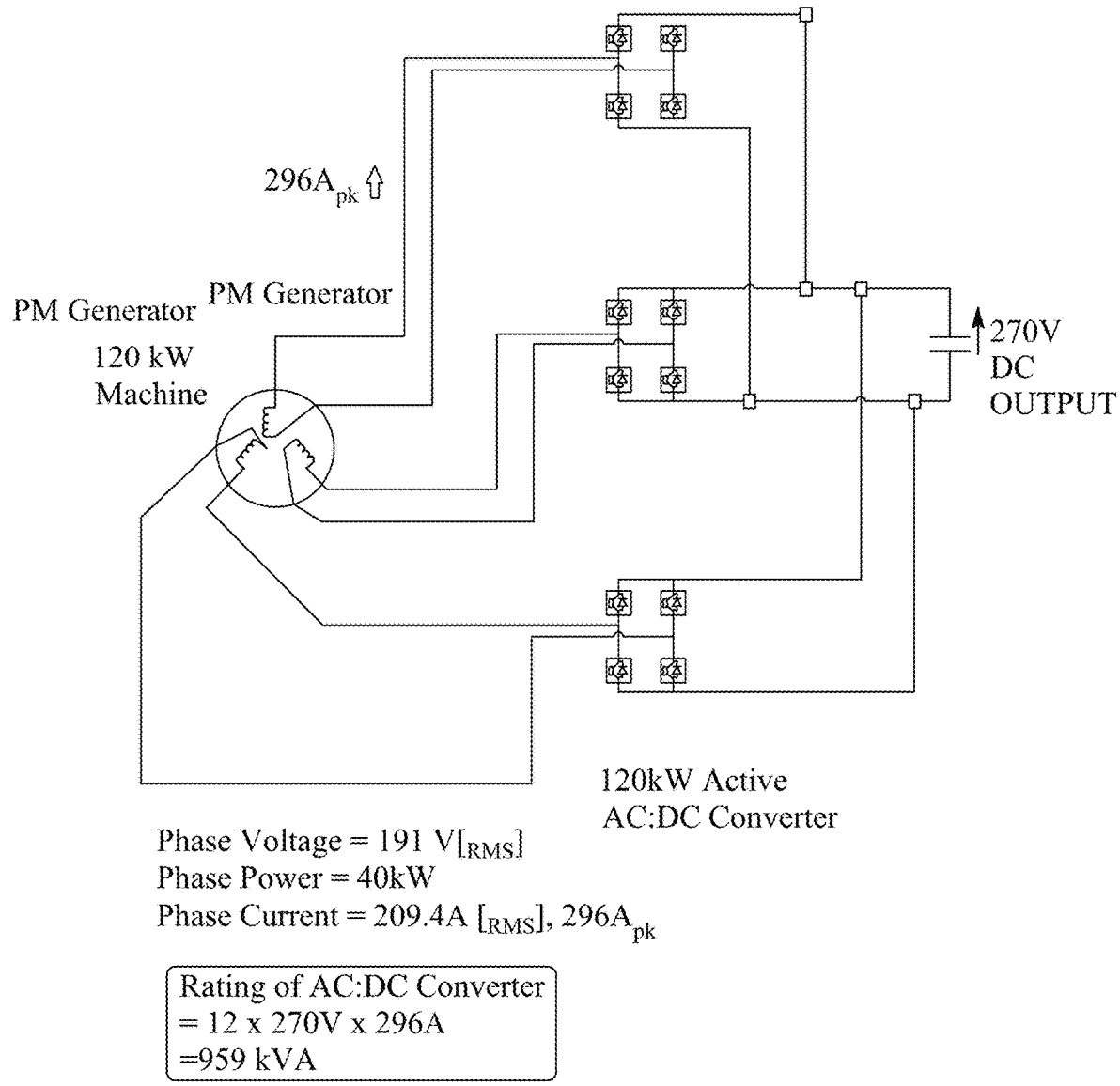
FIG. 5 shows a known single stage voltage converter.

Another known generator and converter arrangement is shown in FIG. 5. In FIG. 5, the generator is also a 120 kW PM machine, with similar voltages and currents to the generator in FIG. 4, and the DC output voltage is 270 $V_{DC}$. Three single-phase H-bridge converters are provided.

In FIG. 4, the phase winding line to neutral voltage transitions between +270 V and −270 V as the converter switches. In FIG. 5, the phase winding voltage also transitions between +270 V and −270 V as the H-bridge converters switch. However, in FIG. 5 the generator requires isolated windings. That is to say, both ends of the stator windings are bought out of the generator and two cables, each rated to carry a peak current of 296 A, are required for each phase of the generator.

Embodiments improve on the above-described known techniques for providing a DC voltage power supply in dependence on a AC voltage power supply. Embodiments are particularly appropriate for generating a 270 $V_{DC}$ power supply in dependence on a 120 kW AC power supply output from a generator on an aircraft. The generator may be, for example, a PM machine with wound fields or a wound field synchronous machine that does not have permanent magnets and instead has electromagnet(s) on the rotor, as described above for known systems.

Figure 6:
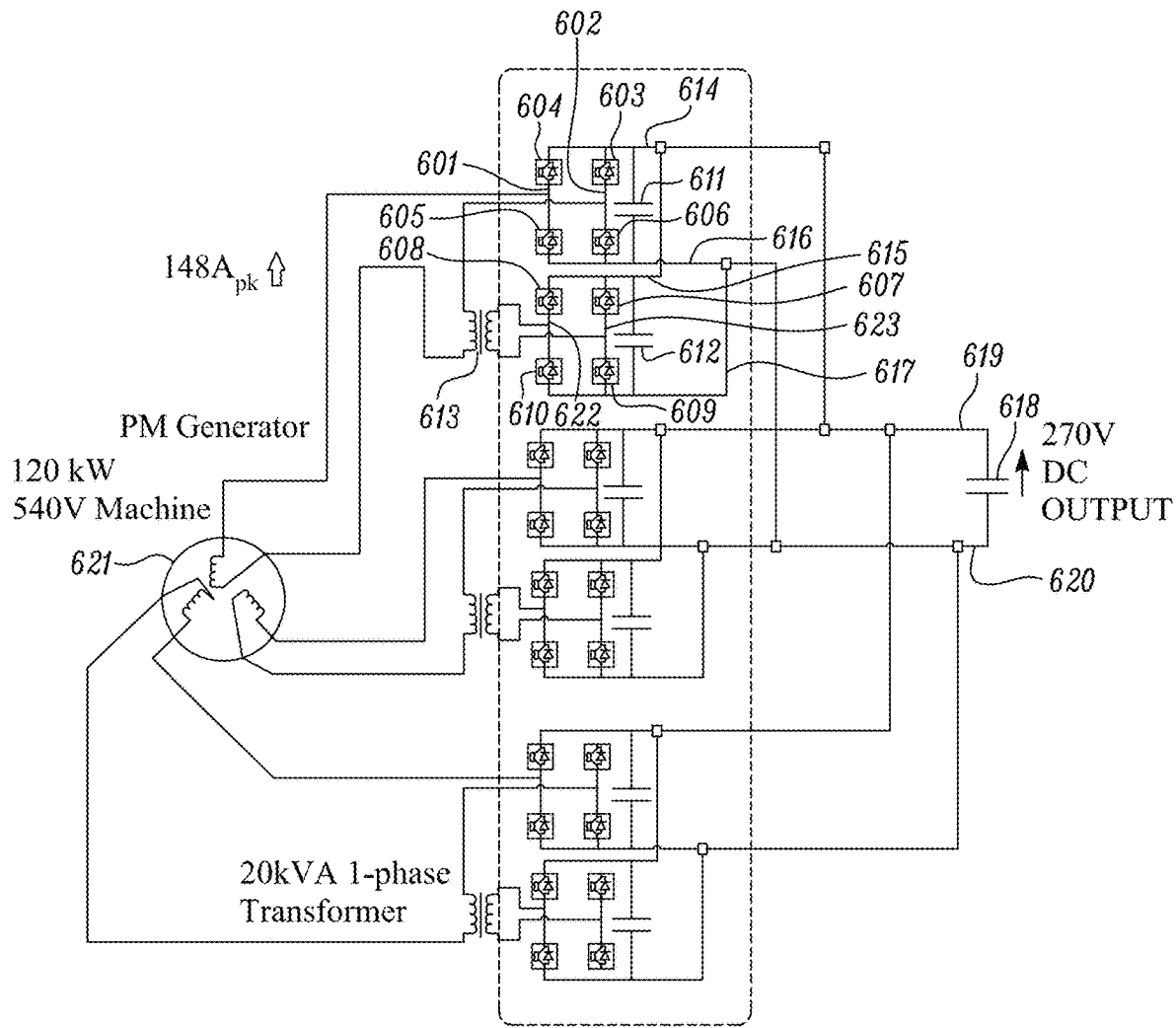
FIG. 6 shows a single stage voltage converter according to a first embodiment.

A first embodiment is shown in FIG. 6. The first embodiment comprises a single stage AC to DC voltage converter system. The converter system comprises one or more phase converters. There may be a respective phase converter for each phase of the generator 621. For a three phase generator 621, as shown in FIG. 6, the converter system may comprise three phase converters.

Each phase converter is an AC voltage to DC voltage converter. Each phase converter comprises an arrangement of two H-bridge circuits. Each H-bridge circuit has DC terminals that provide a DC side of the H-bridge circuit and AC terminals that provide an AC side of the H-bridge circuit. The two H-bridge circuits for each phase converter are connected in parallel with each other on the DC side of the H-bridge circuits and in series with each other on the AC side of the H-bridge circuits. This connection arrangement effectively doubles the voltage at the interface to the generator, on the AC side. The doubling of the AC voltage results in a halving of the AC current. The generator windings and connecting cables may therefore be implemented with a low gauge wire and the power losses in converter system are lower than for the known converter shown in FIG. 5. The H-bridge circuits may also be considered as half-rated H-bridge circuits relative to the H-bridge circuits shown in FIG. 5.

The converter system according to the first embodiment allows designs of both the generator and the converter system to be appropriate for providing a high power, for example 120 kW, 270 $V_{DC}$ power supply.

In addition, there is only a single conversion stage and so the power loss in the converter system is lower than if a plurality of conversion stages are used.

As shown in FIG. 6, each phase converter comprises a first and second H-bridge circuits. In FIG. 6, the upper H-bridge circuit in each phase converter may be the first H-bridge circuit and the lower H-bridge circuit in each phase converter may be the second H-bridge circuit.

The first H-bridge circuit comprises a first AC terminal 601 and second AC terminal 602 as well as first DC terminal 614 and second DC terminal 616. A first switch 604 of the first H-bridge circuit is arranged between the first AC terminal 601 of the first H-bridge circuit and the first DC terminal 614 of the first H-bridge circuit. A second switch 605 of the first H-bridge circuit is arranged between the first AC terminal 601 of the first H-bridge circuit and the second DC terminal 616 of the first H-bridge circuit. A third switch 603 of first the H-bridge circuit is arranged between the second AC terminal 602 of the first H-bridge circuit and the first DC terminal 614 of the first H-bridge circuit. A fourth switch 606 of the first H-bridge circuit is arranged between the second AC terminal 602 of the first H-bridge circuit and the second DC terminal 616 of the first H-bridge circuit.

The second H-bridge circuit comprises a first AC terminal 623 and second AC terminal 622 as well as first DC terminal 615 and second DC terminal 617. A first switch 608 of the second H-bridge circuit is arranged between the second AC terminal 622 of the second H-bridge circuit and the first DC terminal 615 of the second H-bridge circuit. A second switch 610 of the second H-bridge circuit is arranged between the second AC terminal 622 of the second H-bridge circuit and the second DC terminal 617 of the second H-bridge circuit.

A third switch 607 of second the H-bridge circuit is arranged between the first AC terminal 623 of the second H-bridge circuit and the first DC terminal 615 of the second H-bridge circuit. A fourth switch 609 of the second H-bridge circuit is arranged between the first AC terminal 623 of the second H-bridge circuit and the second DC terminal 617 of the second H-bridge circuit.

Each switch may comprise a transistor and/or a diode. For example, each switch may comprise a free-wheel diode arranged in parallel with a transistor according to known implementations of H-bridge circuits.

The first AC terminal 601 of the first H-bridge circuit may be connected to a first end of one of the phases of the generator. The first AC terminal 623 of the second H-bridge circuit may be connected to a second end of the same phase of the generator. One, or both, of the connections between the AC terminals of the phase converter and the generator may be via a transformer, as shown in FIG. 6.

The second AC terminal 602 of the first H-bridge circuit and the second AC terminal 622 of the second H-bridge circuit are connected to each other via an isolation block 613. The isolation block 613 may be any component for blocking DC signals between the AC terminals but allowing AC signals to pass. The isolation block 613 may be, for example, a transformer 613, as shown in FIG. 6. A first terminal of a first side of the transformer 613 is connected to the second AC terminal 602 of the first H-bridge circuit. A second terminal of a first side of the transformer 613 is connected to an AC voltage input to the converter. A first terminal of a second side of the transformer 613 is connected to the second AC terminal 622 of the second H-bridge circuit. A second terminal of a second side of the transformer is connected to the first AC terminal 623 of the second H-bridge circuit.

Each phase converter comprises a DC voltage output with a first terminal and a second terminal. The first terminal of the DC voltage output is connected to the first DC terminal 614 of the first H-bridge circuit and the first DC terminal 615 of the second H-bridge circuit. The second terminal of the DC voltage output is connected to the second DC terminal 616 of the first H-bridge circuit and the second DC terminal 617 of the second H-bridge circuit.

The first H-bridge circuit may comprise a capacitor 611 arranged between its first DC terminal 614 and its second DC terminal 616.

The second H-bridge circuit may comprise a capacitor 612 arranged between its first DC terminal 615 and its second DC terminal 617.

The converter system may comprise one or more of the above-described phase converters with each of the each of the phase converters arranged to receive an AC voltage from the generator 621. Each received AC voltage may be the voltage between the ends of a stator winding of generator 621. Each of a plurality of phase converters may receive an AC voltage from a respective stator winding of the generator 621 with each phase converter receiving an AC voltage from a different stator winding.

The converter system may have a DC output with a first terminal 619 and a second terminal 620. The first terminal 619 of the DC output of the converter system is connected to the first terminal of the DC voltage output of each phase converter. The second terminal 620 of the DC output of the converter system is connected to the second terminal of the DC voltage output of each phase converter.

The converter system may comprise a capacitor 618 arranged between the first terminal 619 of the DC output of the converter system and the second terminal 620 of the DC output of the converter system.

For the converter system as shown in FIG. 6, the specifications of the generator 621, which may be a three phase PM generator, may be 120 kW and 540 V. The phase voltage may be 383 $V_{rms}$, the phase power may be 40 kW, the phase current may be 104.7 $A_{rms}$, with a peak current of 148 A. Each transformer 613 may be a single phase transformer rated at 20 kW. The DC voltage output may be at 270 $V_{DC}$.

As described above, each phase converter comprises an isolation block 613, i.e. isolation, in order to prevent a direct current short circuit arising across the 270 $V_{DC}$ supply. The isolation block 613 may be provided in each phase converter by using single phase transformer 613 as shown in FIG. 6. The transformer 613 would receive half of the AC voltage and the full AC current. The transformer 613 may therefore be nominally rated at 0.5 per-unit. That is to say, three 20 kVA transformers 613 are required for a 120 kW converter operating with a three phase generator 621.

Figure 7A:
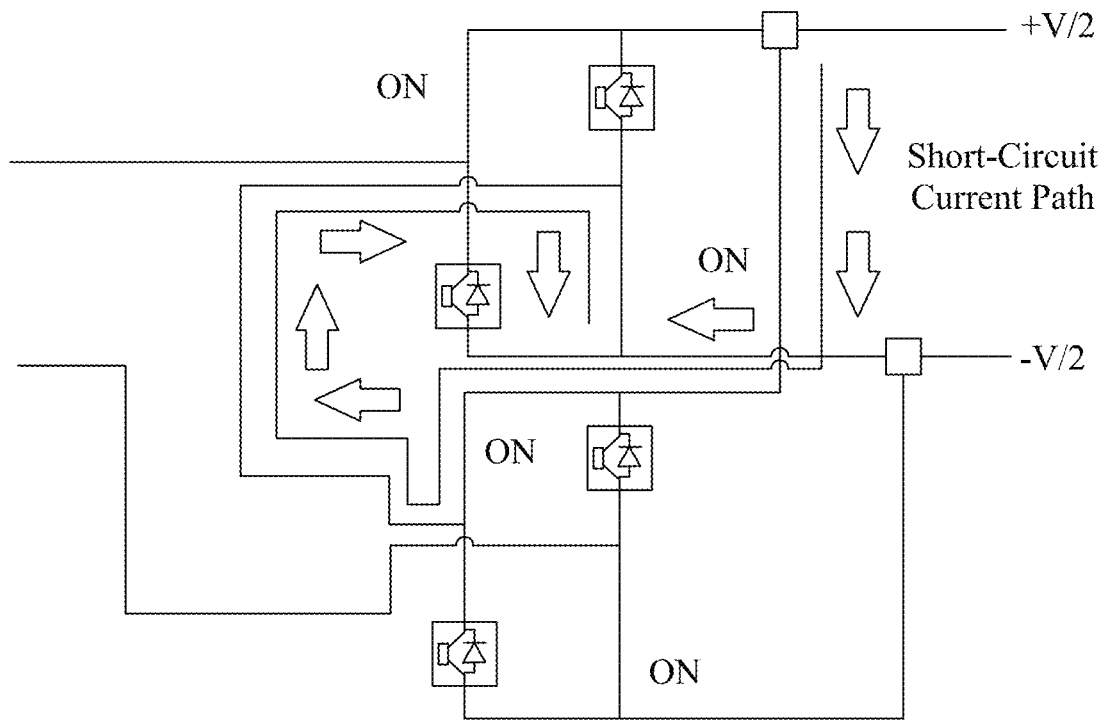
FIGS. 7A and 7B show current flow paths.

FIG. 7A shows how a series-parallel connection of H-bridge circuits may cause a short-circuit of the DC power supply through the switches during operation.

Figure 7B:
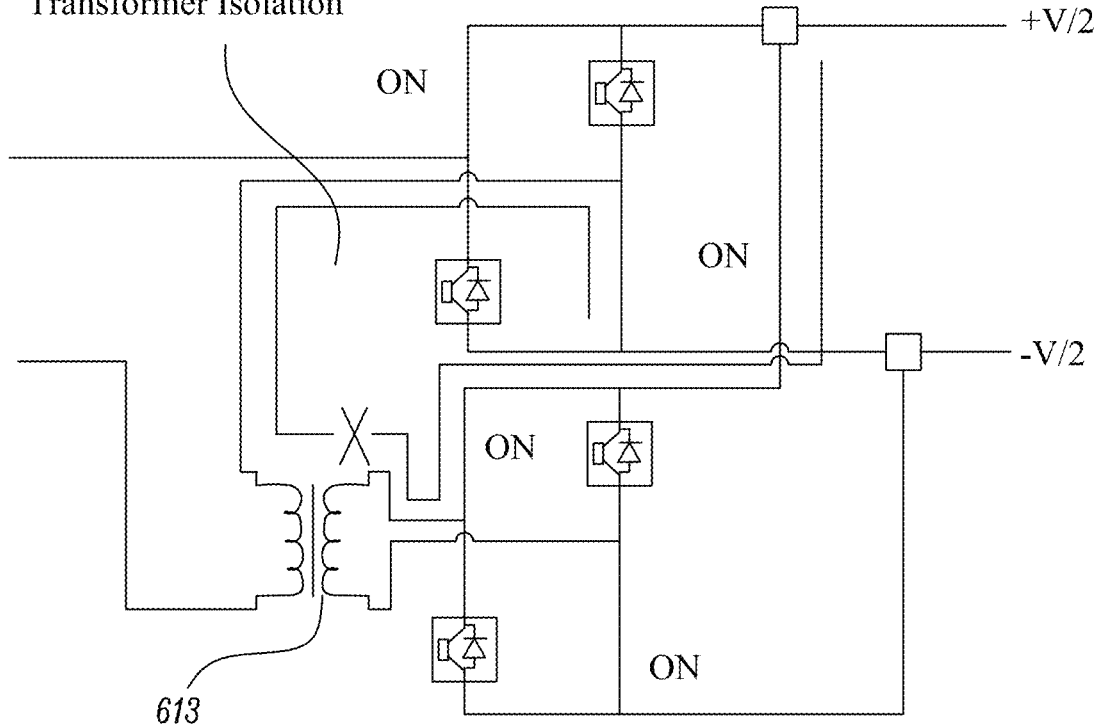

FIG. 7B shows how the use of the transformer 613 provides an isolation block 613 that prevents the short circuit shown in FIG. 7A from occurring.

The first embodiment includes the isolation block 613 being provided in alternative ways than the transformer 613. For example, a capacitor arrangement may be provided in the connecting path between the first and second H-bridge circuits of each phase converter.

It is normal industry practice to de-rate semiconductors and operate them at approximately 50% of their peak rating. Voltage de-rating is important for ensuring the that semiconductors do not fail due to cosmic rays, and that the semiconductors have sufficient margin to withstand dynamic voltage excursions and transients, as may be caused by load changes, faults and inductive switching transients.

The known two stage converter shown in FIG. 4 operates with a DC side voltage of 540 V. Due to the de-rating of the semiconductors, a 540 $V_{DC}$ converter would use 1200 V insulated-gate bipolar transistors, IGBTs. An advantage of the single stage converter of the first embodiment is that it operates with a DC side voltage of 270 $V_{DC}$ and can therefore use 600 V IGBTs. Semiconductor devices for 600 V operation can be manufactured from thinner silicon, or silicon carbide, slices and have a lower on-state voltage drop than an equivalent 1200 V semiconductor device. The conduction losses are therefore lower and the overall converter is more efficient when lower rated components are used. The switching losses of 600 V semiconductor devices may also be lower than those of 1200 V semiconductor devices. The use of lower rated components may also reduce costs.

For electrical generators such as PM machines, the AC voltage can preferably be controlled. The generated back EMF, i.e. internal voltage, of the generator is dependent on the speed of rotation of the rotor. Accordingly, the AC voltage produced at the terminals of the converter may be changed in order to control a generator's current and torque.

Figure 8:
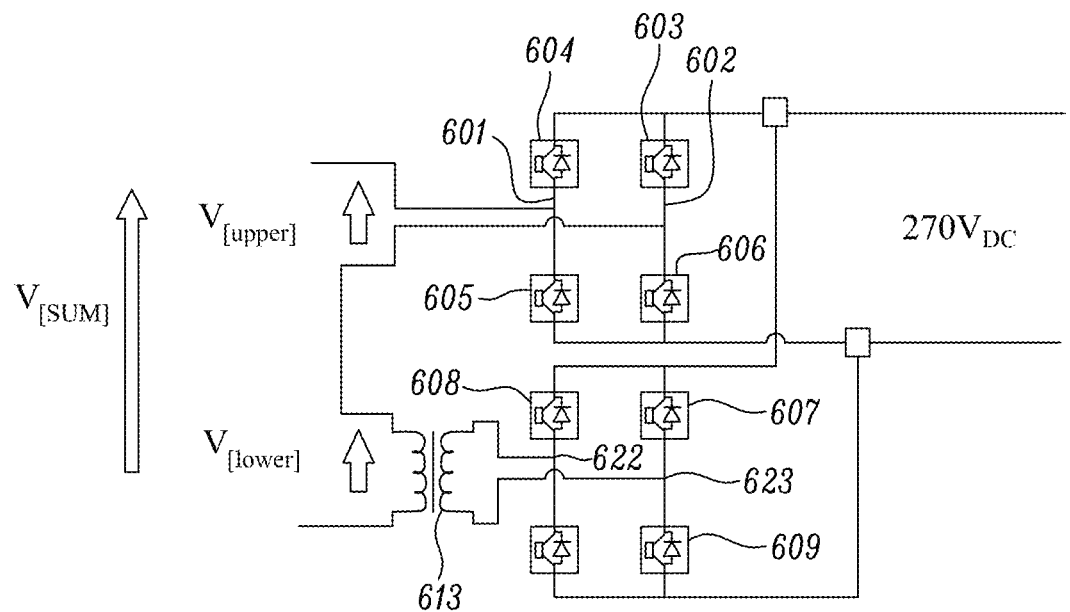
FIG. 8 shows the dependence of an AC voltage on a phase shift.
Figure 8:
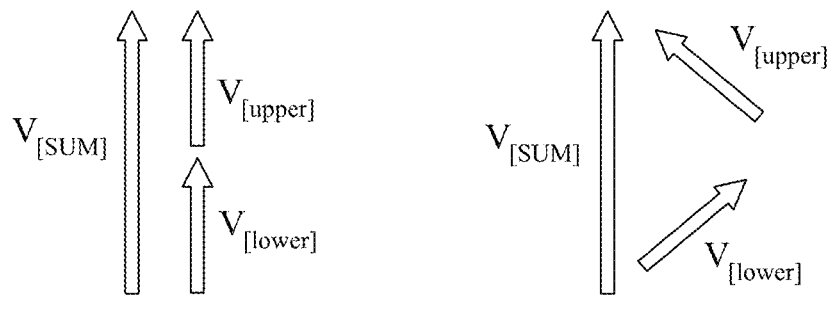

As shown in FIG. 8, the effective AC side voltage for each phase converter of the first embodiment is dependent on the sum of the two AC voltages at the AC terminals 601, 602, 622 and 623 of each of the first and second H-bridge circuits. The maximum AC side voltage is achieved when the AC voltages of each H-bridge circuit are in phase with each other and the H-bridge circuits are operating at their maximum AC to DC voltage ratios, i.e. maximum modulation indexes.

In known converters, the AC side voltage may be controlled by controlling/changing the modulation indexes. The control/change of modulation indexes may be performed by varying the turn-on and turn-off time of a particular pulse-width modulation, PWM, pattern (e.g. Sinusoidal PWM or Space Vector PWM). Alternatively, the modulation indexes may be controlled by changing the PWM pattern.

The converter design of first embodiment allows AC side voltage control to alternatively, or additionally, be realised by changing the phase difference between the AC voltages across the AC terminals 601, 602, 622 and 623 of the first and second H-bridge circuits. As shown in FIG. 8, the magnitude of the sum of the AC voltages is reduces when a phase shift that causes the voltages to be out of phase increases.

The first embodiment includes a number of possible modifications to the circuit design as shown in FIG. 6 for controlling and changing the phase difference between a first AC voltage, that is between the AC terminals 601 and 602 of the first H-bridge circuit, and a second AC voltage, that is between the AC terminals 622 and 623 of the second H-bridge circuit. For example, one or more phase shifters, such as electronically controllable variable delay lines, may be included between the first AC terminal 623 of the second H-bridge circuit and the transformer 613 as well as the second AC terminal 622 of the second H-bridge circuit and the transformer 613.

Control of the AC voltage by phase shifting may allow a wide range of voltage control with minimum converter switching and low harmonic distortion. For example, two sinusoidal voltage waveforms may be phase shifted and added to give a sinusoidal waveform of a lower magnitude without changing the switching pattern. Control of the AC voltage by phase shifting can be used as an alternative to, or in addition to, known techniques, such as PWM notching, to achieve AC side voltage control.

Control of the AC voltage by phase shifting is not possible with the known converters shown in FIGS. 4 and 5 that require a voltage with significant notches to be introduced to control the AC voltage. This can cause waveforms to have a high harmonic content and the higher order harmonics cause additional electrical losses in the generator in the form of copper losses in the windings, iron losses in the laminations and eddy-current losses in the permanent magnets.

In addition to the PWM and phase shifting voltage techniques for controlling the voltage on the AC side, the PWM patterns associated with each H-bridge circuit of the phase converters may be interleaved. That is to say, the timing of the switching is changed. For example, switches that would have switched at substantially the same time are controlled so that they do not switch at substantially the same time. Interleaving may reduce harmonic components of the voltage and/or current on both sides of the phase converter. Such a reduction in harmonics can reduce the ripple current flowing in the DC side filter capacitors and therefore reduce their rating/size. The harmonic currents in the generator 621 may also be reduced and losses and torque ripple decreased.

Introducing a fixed phase shift into the switching timing can eliminate AC and DC side harmonics. The two H-bridge circuits of a phase converter may be operated at defined phase angles with respect to each other such that certain harmonics appear in anti-phase and thus cancel each other. For example, for two H-bridge circuits operating at 0 and 30 degrees, a $6^{th}$ harmonic appears at 6×0 degrees for one channel and 6×30=180 degrees in the second channel. The $6^{th}$ harmonic therefore does not occur.

The first embodiment includes a number of possible modifications to the circuit design as shown in FIG. 6 so that a variable timing of the switching can be implemented. For example, a switching controller may be provided that is arranged to control the switching times of one or more of the switches 603, 604, 605 and 606 in the first H-bridge circuit and/or one or more of the switches 607, 608, 609 and 610 in the second H-bridge circuit. The switching controller may include one or more electronically controllable variable delay lines.

An advantage of the phase converters of the first embodiment is that they can be adapted for a range of applications, in particular applications that may require a higher DC voltage supply than 270 $V_{DC}$. The higher voltage requirement can be realised through phase shifting and there is no need to fundamentally change the design of the generator and converter.

Another advantage of the phase converters of the first embodiment is that they have an improved DC Fault Response. A problem with converters that provide the interface between a generator and a DC network is that a short circuit fault on the DC network can cause high currents to flow through the free-wheel diodes connected across each transistor. The magnitude of current is dependent on the internal voltage of the generator and the internal impedance of the generator. Known designs of generators usually have an impedance of 0.5 per-unit such that when operating at rated speed and generating a 1.0 per-unit voltage, the fault current would be 2.0 per-unit, i.e. twice the rated current.

Figure 9A:
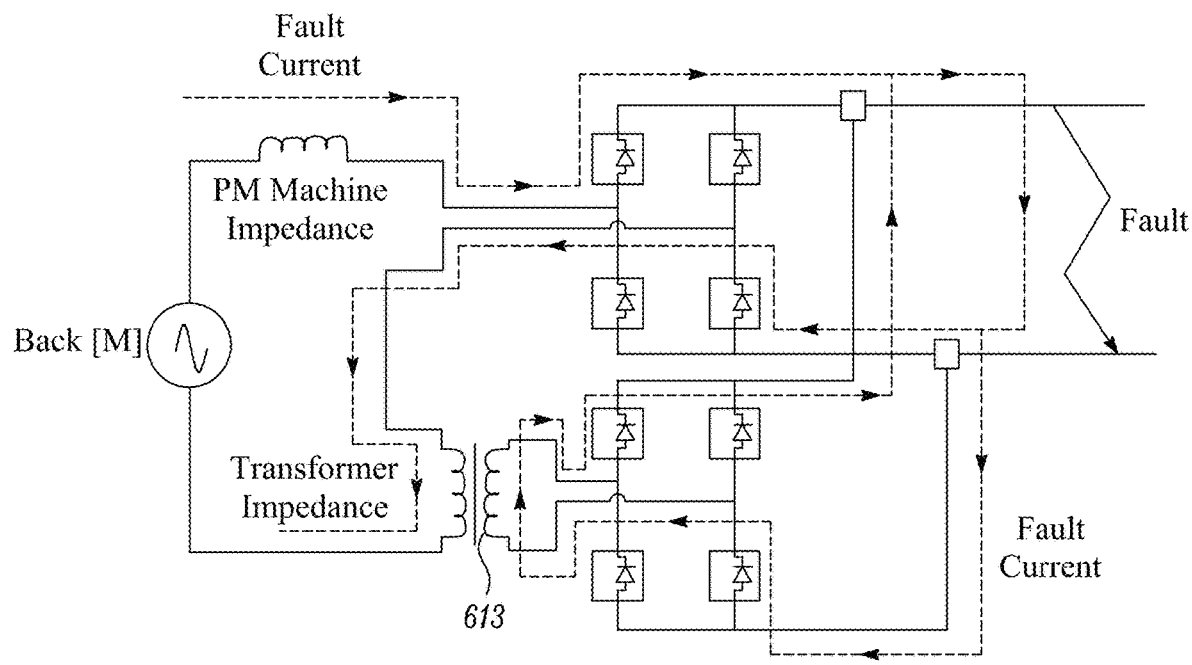
FIGS. 9A and 9B show current flow paths.
Figure 9B:
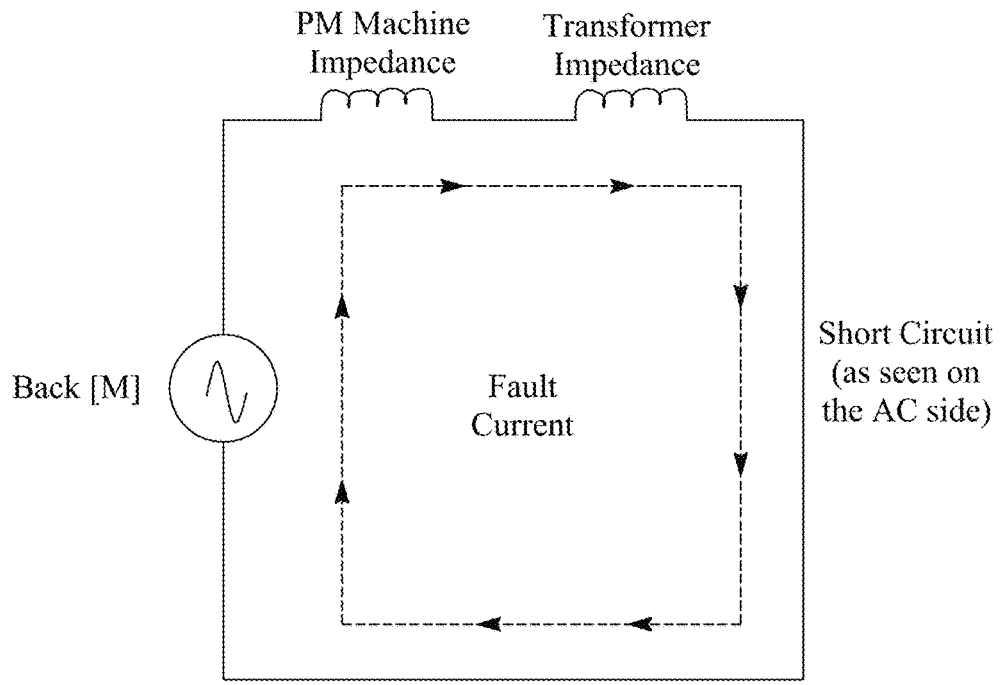

The phase converters shown in FIG. 6 all comprise a transformer 613. As shown in FIGS. 9A and 9B, the impedance of the transformer 613 reduces the short circuit fault current because it appears in series with the internal impedance of the generator 621. The reduced fault current allows the generator 621 and phase converter to operate for a longer period of time until the fault is isolated.

The additional series transformer impedance allows the system to be designed with a generator internal impedance of approximately 0.5 per-unit but has the advantage of a lower of over-current in the event of a fault. The used transformer 613 may have an impedance that is high enough to reduce the magnitude of fault currents so that they are within the rating of the semiconductor devices. Any damage caused by a fault is therefore reduced/prevented.

Figure 10:
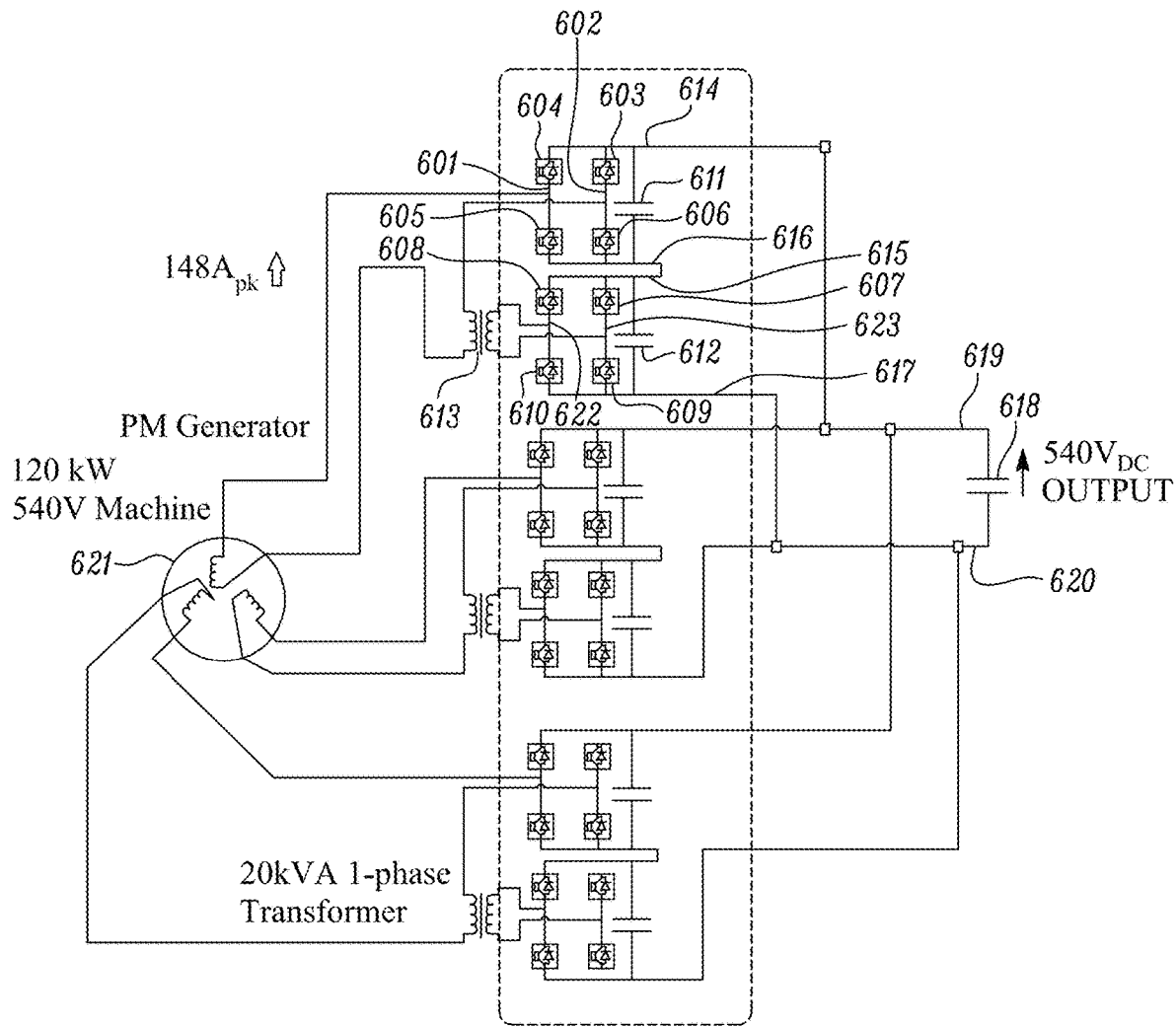
FIG. 10 shows a single stage voltage converter according to a second embodiment.

A converter system according to a second embodiment is shown in FIG. 10. The converter system according to the second embodiment differs from that of the first embodiment in that the DC output voltage is increased from 270 $V_{DC}$ to 540 $V_{DC}$.

The converter system of the second embodiment may be realised by changing, for each of the phase converters, the series-parallel connection of H-bridge circuits to a series-series connection of H-bridge circuits.

The second embodiment comprises phase converters as described for the first embodiment with the differences including:

the first DC terminal 614 of the first H-bridge circuit is not attached to the first DC terminal 615 of the second H-bridge circuit;

the second DC terminal 616 of the first H-bridge circuit is attached to the first DC terminal 615 of the second H-bridge circuit;

the first terminal of the DC voltage output of each phase converter is provided by the first DC terminal 614 of the first H-bridge circuit only; and the second terminal of the DC voltage output of each phase converter provided by the second DC terminal 617 of the second H-bridge circuit only.

The generator and other components of the converter system of according to the second embodiment may otherwise be substantially as described for the first embodiment.

The converter system of the second embodiment may be easily constructed by changing the connections of a converter system that has already been constructed for 270 $V_{DC}$ operation, according to the first embodiment.

Embodiments also include a method for providing a DC power supply using the converter system of the first or second embodiments.

The generator of the first and second embodiments may be driven by a gas turbine engine. In particular, the generator of the first and second embodiments may be driven by the gas turbine engine 10 as described earlier with reference to FIGS. 1 to 3. The gas turbine engine 10 may be located on an aircraft.

Embodiments include a number of modifications and variations to the techniques as described above.

For example, the converters according to the first and second embodiments may be used in any application and are not restricted to use on aircraft. Applications of embodiments include providing a power supply on other vehicles, such as ships, as well as with land based applications, such as a power supply for a factory.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A converter for converting an AC voltage to a DC voltage, the converter comprising:
    a first H-bridge circuit comprising a first AC terminal configured to receive an AC voltage, a second AC terminal, a first DC terminal and a second DC terminal;
    a second H-bridge circuit comprising a first AC terminal configured to receive an AC voltage, a second AC terminal, a first DC terminal and a second DC terminal;
    an isolation block configured to electrically isolate the second AC terminal of the first H-bridge circuit from the second AC terminal of the second H-bridge circuit, the isolation block being not connected to the first AC terminal of the first H-bridge circuit; and
    a DC voltage output of the converter with a first terminal and a second terminal,
    wherein:
        the first terminal of the DC voltage output is connected to the first DC terminal of the first H-bridge circuit and the first DC terminal of the second H-bridge circuit, and
        the second terminal of the DC voltage output is connected to the second DC terminal of the first H-bridge circuit and the second DC terminal of the second H-bridge circuit.

2. A converter for converting an AC voltage to a DC voltage, the converter comprising:
    a first H-bridge circuit comprising a first AC terminal configured to receive an AC voltage, a second AC terminal, a first DC terminal and a second DC terminal;
    a second H-bridge circuit comprising a first AC terminal configured to receive an AC voltage, a second AC terminal, a first DC terminal and a second DC terminal;
    an isolation block configured to electrically isolate the second AC terminal of the first H-bridge circuit from the second AC terminal of the second H-bridge circuit, the isolation block being not connected to the first AC terminal of the first H-bridge circuit; and
    a DC voltage output of the converter with a first terminal and a second terminal,
    wherein:
        the second DC terminal of the first H-bridge circuit is connected to the first DC terminal of the second H-bridge circuit,
        the first terminal of the DC voltage output is connected to the first DC terminal of the first H-bridge circuit, and
        the second terminal of the DC voltage output is connected to the second DC terminal of the second H-bridge circuit.

3. The converter according to claim 1,
    wherein the first H-bridge circuit comprises:
        a first switch of the first H-bridge circuit, wherein the first switch is arranged between the first AC terminal of the first H-bridge circuit and the first DC terminal of the first H-bridge circuit;
        a second switch of the first H-bridge circuit, wherein the second switch is arranged between the first AC terminal of the first H-bridge circuit and the second DC terminal of the first H-bridge circuit;
        a third switch of the first H-bridge circuit, wherein the third switch is arranged between the second AC terminal of the first H-bridge circuit and the first DC terminal of the first H-bridge circuit; and
        a fourth switch of the first H-bridge circuit, wherein the fourth switch is arranged between the second AC terminal of the first H-bridge circuit and the second DC terminal of the first H-bridge circuit; and
    wherein the second H-bridge circuit comprises:
        a first switch of the second H-bridge circuit, wherein the first switch is arranged between the second AC terminal of the second H-bridge circuit and the first DC terminal of the second H-bridge circuit;
        a second switch of the second H-bridge circuit, wherein the second switch is arranged between the second AC terminal of the second H-bridge circuit and the second DC terminal of the second H-bridge circuit;
        a third switch of the second H-bridge circuit, wherein the third switch is arranged between the first AC terminal of the second H-bridge circuit and the first DC terminal of the second H-bridge circuit; and
        a fourth switch of the second H-bridge circuit, wherein the fourth switch is arranged between the first AC terminal of the second H-bridge circuit and the second DC terminal of the second H-bridge circuit.

4. The converter according to claim 3, wherein one or more of the first, second, third and fourth switches of the first H-bridge circuit comprise a transistor and/or a diode; and/or one or more of the first, second, third and fourth switches of the second H-bridge circuit comprise a transistor and/or a diode.

5. The converter according to claim 1, wherein the first H-bridge circuit comprises a capacitor arranged between the first DC terminal and the second DC terminal of the first H-bridge circuit; and/or the second H-bridge circuit comprises a capacitor arranged between the first DC terminal and the second DC terminal of the second H-bridge circuit.

6. The converter according to claim 1, wherein the isolation block is a transformer.

7. The converter according to claim 6, wherein:
a first terminal of a first side of the transformer is connected to the second AC terminal of the first H-bridge circuit;
a second terminal of a first side of the transformer is connected to an AC voltage input to the converter;
a first terminal of a second side of the transformer is connected to the second AC terminal of the second H-bridge circuit; and
a second terminal of a second side of the transformer is connected to the first AC terminal of the second H-bridge circuit.

8. The converter according to claim 1, further comprising one or more phase shifters;
wherein, in use, there is a first AC voltage between the first AC terminal and second AC terminal of the first H-bridge circuit;
there is a second AC voltage between the first AC terminal and second AC terminal of the second H-bridge circuit; and
the one or more phase shifters are arranged to control the phase difference between the first AC voltage and the second AC voltage.

9. The converter according to claim 3, further comprising a switching controller;
wherein, in use, the switching times of one or more of the switches in the first H-bridge circuit and/or one or more of the switches in the second H-bridge circuit are dependent on the switching controller.

10. A converter system for providing a DC voltage in dependence on an AC voltage, the converter system comprising:
a DC output of the converter system with a first terminal and a second terminal; and a plurality of converters according to claim 1,
wherein:
each of the plurality converters is arranged to receive an AC voltage;
the first terminal of the DC output of the converter system is connected to the first terminal of the DC voltage output of each converter; and
the second terminal of the DC output of the converter system is connected to the second terminal of the DC voltage output of each converter.

11. The converter system according to claim 10, wherein the converter system further comprises a capacitor arranged between the first terminal of the DC output of the converter system and the second terminal of the DC output of the converter system.

12. A DC power supply comprising an AC generator and the converter system according to claim 10, wherein:
the number of converters that the converter system comprises is the same as the number of output phases of the AC generator; and
each converter of the converter system is arranged to receive an AC voltage from a different output phase of the AC generator.

13. The DC power supply according the claim 12, wherein the number of converters comprised by the converter system is three.

14. A gas turbine engine system comprising:
a gas turbine engine; and
the DC power supply according to claim 12;
wherein the gas turbine engine is arranged to drive the AC generator of the DC power supply.

15. A method for providing a DC power supply, the method comprising:
receiving an AC voltage by a converter according to claim 1;
generating a DC voltage in dependence on each received AC voltage; and
outputting the generated DC voltage.

16. The method for providing a DC power supply of claim 15, wherein the converter is one of a plurality of converters in a converter system and the converter system comprises: a DC output of the converter system with a first terminal and a second terminal; and wherein: each of the plurality converters is arranged to receive an AC voltage; the first terminal of the DC output of the converter system is connected to the first terminal of the DC voltage output of each converter; and the second terminal of the DC output of the converter system is connected to the second terminal of the DC voltage output of each converter, the method comprising:
receiving an AC voltage by the converter system;
generating a DC voltage in dependence on each received AC voltage; and
outputting the generated DC voltage.

* * * * *